Dec. 21, 1943.  H. J. DE N. McCOLLUM  2,337,484
AUTOMATICALLY CONTROLLED HEATER
Filed July 23, 1942  3 Sheets-Sheet 1
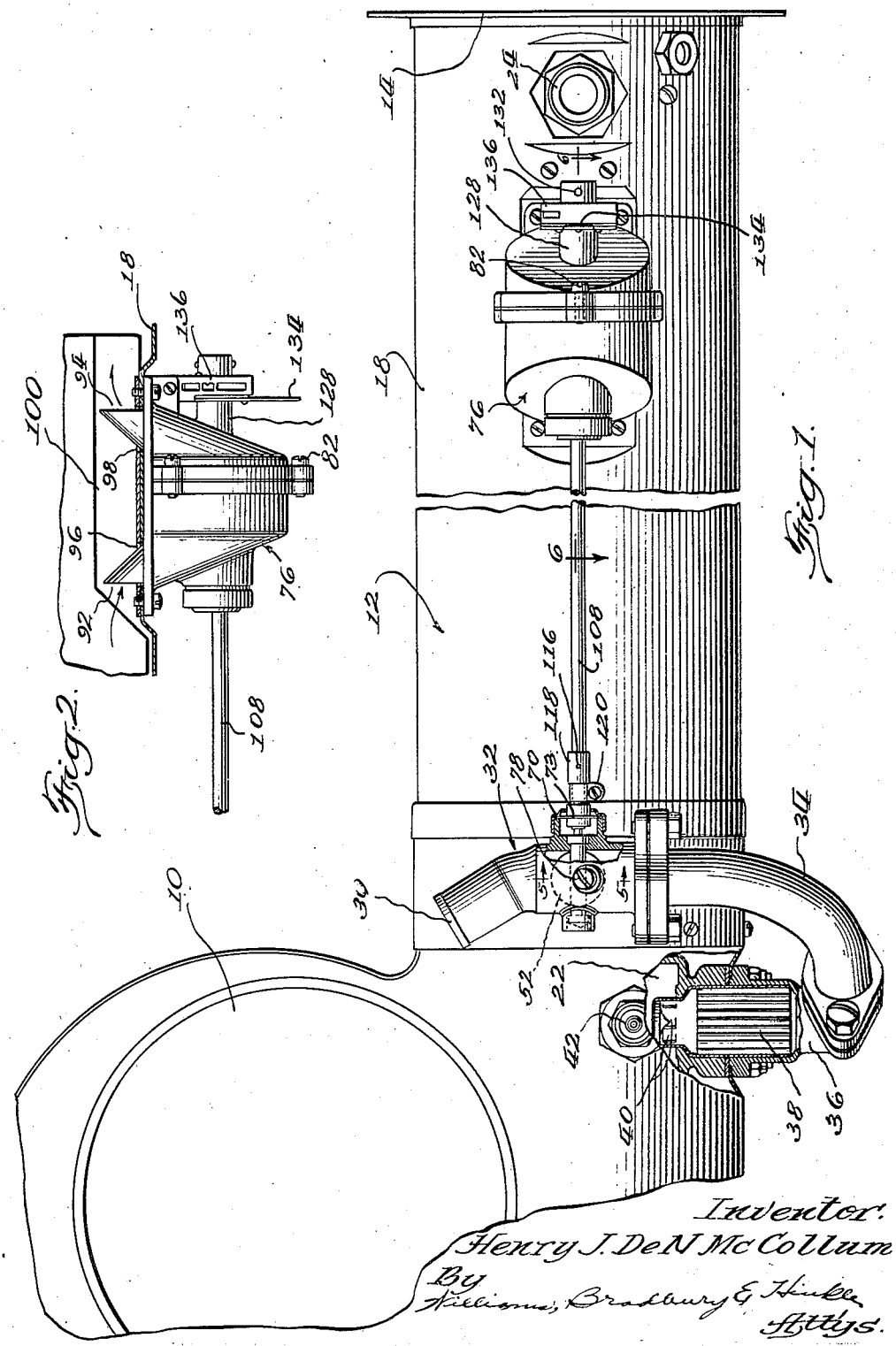

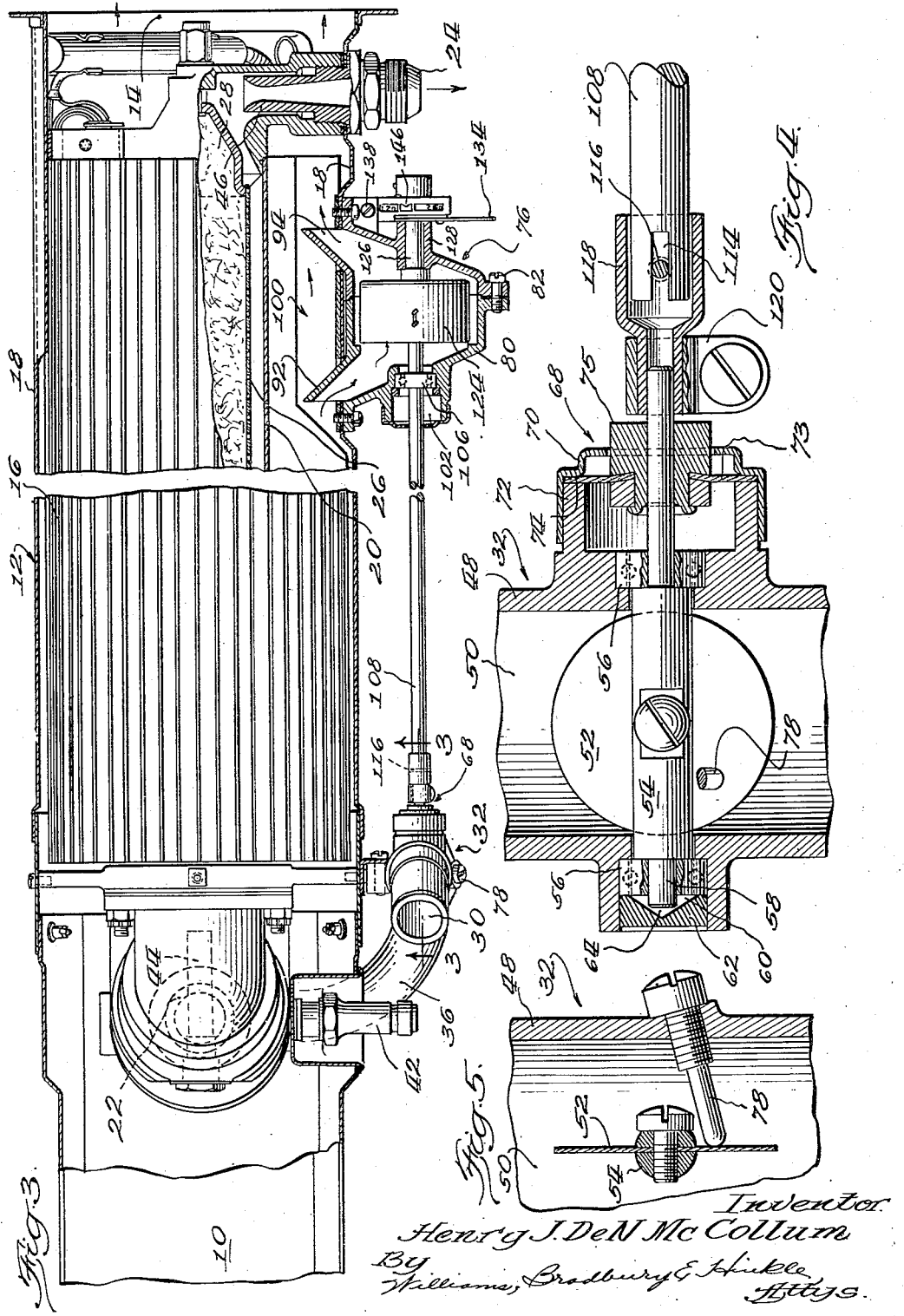

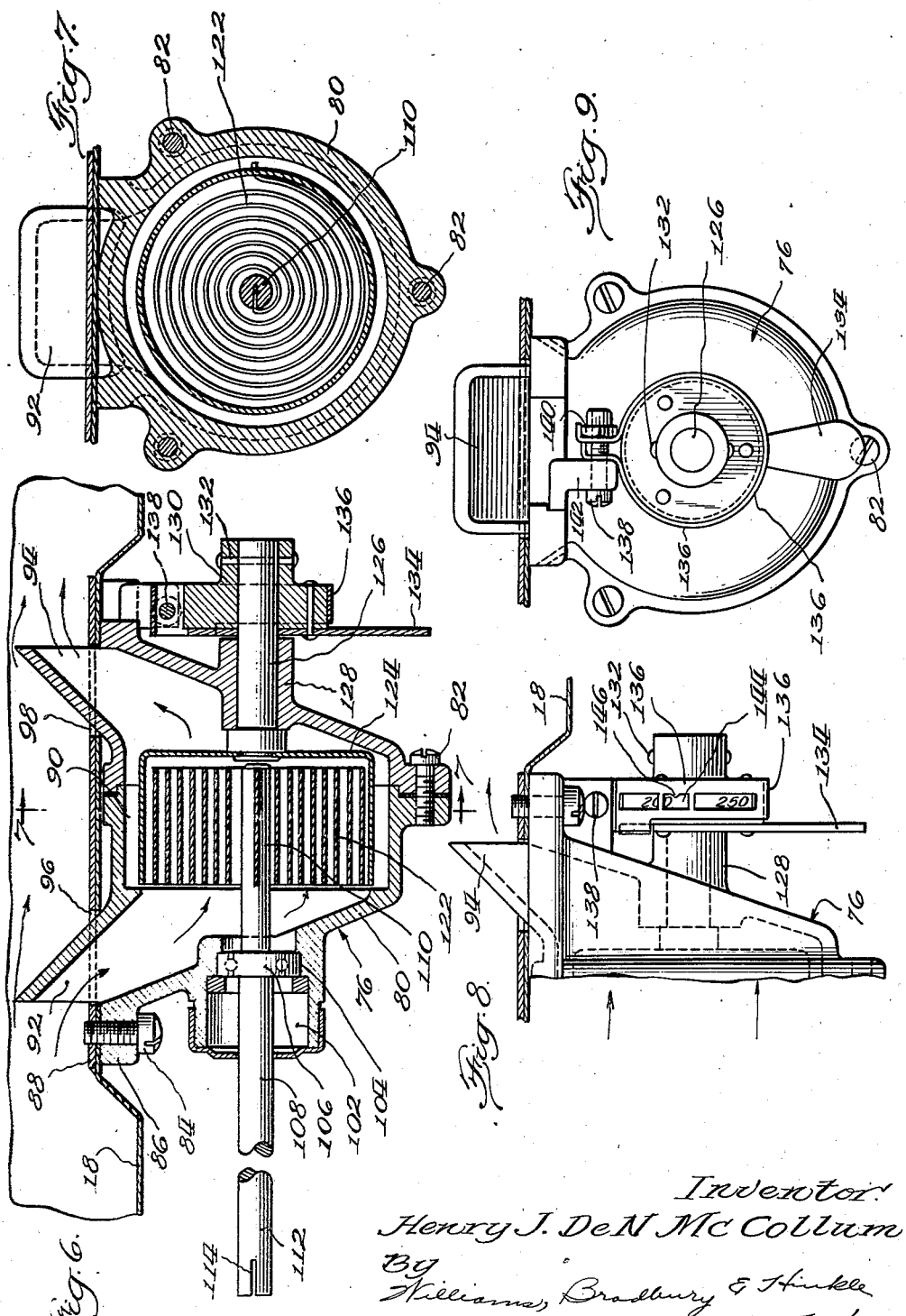

Patented Dec. 21, 1943

2,337,484

UNITED STATES PATENT OFFICE 2,337,484

AUTOMATICALLY CONTROLLED HEATER

Henry J. De N. McCollum, Chicago, Ill.

Application July 23, 1942, Serial No. 452,014

7 Claims. (Cl. 236—10)

The present invention relates to automatically controlled heaters. More particularly the invention is directed to a thermostatically actuated automatic throttle control in conjunction with an internal combustion heater of the general type shown in my copending application, Serial No. 447,345, filed June 17, 1942, for Heating apparatus.

The previously mentioned copending application relates to internal combustion type heaters, that is, heaters in which combustion takes place in a sealed combustion chamber, and more particularly to a heater of that type adapted for use in aircraft and other vehicles in which maximum heat production is desired from a heater of minimum size and weight. Such a heater has a throttle valve for regulating the rate of flow of combustible mixture to the combustion chamber. By the operation of this valve, the quantity of heat produced by the heater in any given time can be determined. Through the use of the present invention, the heater can be pre-set to supply air heated to any desired temperature within the capacity of the heater. The invention also prevents overheating or underheating. The novel arrangement provided for securing this automatic regulation is the principal object of the present invention.

An additional object of the present invention is to provide an internal combustion heater of novel construction which includes mechanism for automatically determining the temperature of the air issuing from the heater.

Still another object of the present invention is to provide an internal combustion heater of the forced circulation hot air type in which the temperature of the air issuing from the heater will remain substantially constant regardless of the quantity of air forced through the heater by the circulating means.

Yet another object of the present invention is to provide a novel automatic heater throttle control which is thermostatically actuated and which accomplishes its regulating function directly, that is, without the use of an electrical circuit or intermediate mechanism.

Yet another object of the present invention is to provide such an automatic regulating means which is so arranged that it offers a minimum of resistance to the flow of air through the heater and yet develops sufficient effort to operate the throttle valve directly with considerable sensitivity.

Yet another object of the present invention is to provide a novel automatic heater regulating mechanism which can be pre-set to a desired temperature and which thereafter will operate directly to maintain that temperature.

Other objects and advantages will become apparent from the following description of a preferred embodiment of my invention which is illustrated in the accompanying drawings.

In the drawings in which similar characters of reference refer to similar parts throughout the several views:

Fig. 1 is a side elevation of the major portion of an internal combustion heater embodying the present invention;

Fig. 2 is a plan view of the thermostatic regulating unit shown attached to the heater in Fig. 1;

Fig. 3 is a plan view of the mechanism illustrated in Fig. 1 with the outer sheet metal casing of the heater, the thermostatic unit, and the outlet end of the heater shown in section;

Fig. 4 is a vertical longitudinal sectional view of the throttle valve and may be considered as taken in the direction of the arrows substantially along the line 4—4 of Fig. 3;

Fig. 5 is a vertical transverse sectional view through the throttle valve and may be considered as taken in the direction of the arrows along the line 5—5 of Fig. 1;

Fig. 6 is a horizontal medial sectional view of the thermostatic control mechanism taken along the line 6—6 of Fig. 1 looking downwardly as indicated by the arrows;

Fig. 7 is a transverse sectional view through the thermostatic mechanism taken in the direction of the arrows along the line 7—7 of Fig. 6;

Fig. 8 is a fractional plan view of the rearward portion of the thermostatic control mechanism; and Fig. 9 is an end view of the thermostatic mechanism looking toward the left, as seen in Fig. 1.

Referring to the drawings, particularly Figs. 1 and 3, the heater there shown is comprised of a blower, indicated by the numeral 10, which forces air to be heated through a heat exchanger 12, the hot air issuing from the heater at the opposite end 14.

Within the heat exchanger 12 the air passes between longitudinally extending heat exchange fins 16, these fins being enclosed within an outer sheet metal housing 18. At their inner edges the fins are secured to a tubular member 20 through which the hot products of combustion pass from a combustion chamber 22, located toward the left as seen in Figs. 1 and 3, to an exhaust connection 24, toward the right in the same figures. A tubular silencer 26 is positioned within the cylindrical tube 20, thus providing an annular space between the tubes 20 and 26, through which the hot products of combustion pass. The silencer tube has perforated walls and contains a quantity of stainless steel wool 28, or other acoustic damping material which quiets the operation of the heater and aids in maintaining a steady flow of the hot products of combustion, that is, it damps out hunting and so-called motor boating.

A combustible mixture, for instance, a mixture of gasoline and air, enters the inlet opening 30 of the throttle valve indicated generally by the numeral 32. This mixture passes downwardly through the throttle valve and into a conduit 34 which conveys the mixture to an inlet tube 36 of the heater. Within the inlet tube the mixture passes upwardly through a bundle of small diameter metal tubes 38 which act as a flame arrester and prevent flame from flashing back into the conduit 34. The mixture then passes outwardly through radial ports 40 into the combustion chamber 22 where the mixture is ignited by an igniter plug 42. This igniter is of the hot wire type, that is, a wire element is heated electrically to a temperature sufficient to bring about combustion of the combustible mixture. The igniter ordinarily operates only for the purpose of initiating combustion, after which the combustible mixture heats a reigniter element 44 so that thereafter the hot reigniter element re-establishes combustion if it should, for any reason, fail momentarily. The reigniter shown is in the form of a spirally coiled sheet of inconel or other suitable heat and corrosion resistant metal, this particular reigniter being more fully described in my copending application, Serial No. 410,039, filed September 8, 1941.

As has been mentioned previously, the hot products of combustion pass from the combustion chamber 22 through the annular space between the heat exchange tube 20 and the silencer tube 26, these hot products of combustion being collected at the opposite end of the heater and passed outwardly through the exhaust connection 24. The exhaust connection 24 includes a generally Venturi shaped restricting tube 46 which regulates the flow of the hot products of combustion from the heater. The flow of combustible mixture and hot products of combustion through the heater can be effected either by connecting a suction tube to the outlet fitting 24 or by passing combustible mixture to the throttle connection 30 under pressure.

The throttle valve 32 comprises essentially a housing 48 having a bore 50 therethrough within which a butterfly valve 52 is positioned. This butterfly valve is secured to a rotatable shaft 54 mounted at each side of the valve 52 in ball bearings 56. The outer end 58 of the shaft 54 and its ball bearing 56 are located within a recess 60 formed in the valve housing and this opening 60 is closed from the outside by a cap 62 having a re-entrant conical surface 64 on its inner face to clear the end of the shaft 58.

The opposite end of the shaft 54 extends through the other bearing 56 and through a cap 68 which prevents dirt entering the inner bearing 56. The cap includes a sheet metal cup 70 which slips over a spud 72 formed as a portion of the valve housing. This cup 70 carries a flexible washer 73 of felt or other suitable material which is pressed against the end of the spud 72 by an annular face 74. The flexible washer 73 in turn carries a collar 75 which surrounds and loosely fits the shaft 54. Thus the shaft 54 is aligned in the bearings 56, while the collar 75 floats in the flexible washer 73, with the result that the collar can align itself upon the shaft 54 with very little tendency to bind.

As will be explained presently, the butterfly valve 52 is rotated between a fully opened position, shown in Figs. 4 and 5, and a more nearly closed position, depending upon the temperature of the air passing through the heat exchanger, this regulation being accomplished by a thermostatic element 76. In its fully opened position the butterfly valve 52 impinges against the end of a limit stop screw 78 threaded through the side wall of the valve housing. Thus, the screw 78 permits the thermostat fully to open the valve, but prevents torque developed by the thermostat in the opening direction from reclosing the valve after the valve has reached its fully open position.

The principal structural element of the thermostatic unit 76 is a hollow housing 80 constructed in two halves, the halves being clamped in assembled relationship by means of screws 82. This housing is secured to the outer sheet metal shell 18 of the heat exchanger 12 in a position adjacent the outlet end. It is attached to this shell by means of screws 84 which extend through flanges 86 at each end of the housing 80, through the sheet metal shell 18, and which at their inner ends are threaded into a metal plate 88 which underlies the sheet metal and aids in stiffening the shell at the point of attachment of the thermostatic unit. The flanges 86 are flat and since the shell 18 is generally cylindrical, the portion of the shell to which the thermostatic unit is attached is flattened so as to give the unit a firm base of support.

The central portion of the hollow housing 80 provide a cylindrical space 90 connected to the interior of the heat exchanger by means of an inlet scoop 92 and an outlet vent 94. The scoop 92 and the vent 94 project through openings 96 and 98, respectively, formed in the heat exchanger shell and extend into the path of the air flowing through the heat exchanger. To permit this, portions of the heat exchange fins 16 are cut away as indicated at 100 in Figs. 2 and 3.

A portion of the air flowing through the heat exchanger is thus deflected by the scoop 92 and is caused to flow outwardly, through the central space 90, and then inwardly through the vent 94 so as to return to the air stream flowing through the heat exchanger. Because of the velocity head of the air flowing against the scoop 92 and the aspirating effect at the vent 94, the air within the central space 90 will change rapidly and will always be at substantially the temperature of the air flowing through the heat exchanger. Thus any variation in the temperature of the air within the heat exchanger will be immediately reflected by a similar change in the temperature of the air within the space 90.

The side of the housing 80 facing the valve 32 is formed to provide a recess 102, the lower portion of which is of reduced diameter and forms an annular seat 104 to retain the outer race of a ball bearing 106. A shaft 108 extends through the bearing 106 with its inner end 110 projecting substantially through the central chamber 90. The opposite end 112 of this shaft has a slot 114 which straddles a pin 116 extending transversely through a socket 118 secured to the end of the shaft 54. The socket 118 has a diameter slightly larger than the shaft 108 and serves to align the outer end of this shaft, while the pin 116 transmits the torque from the shaft 108 to the socket 118. The socket 118 is slipped over the end of the shaft 54 and is secured in place so as to prevent relative rotation between these parts by means of a screw type clamp 120.

The inner end 110 of the shaft 108 is slotted and embraces the inner coil of a helical bi-metal thermostatic element 122. This helical bi-metal unit is encased within a cup 124 and has its outer end secured thereto. The central portion of the cup is securely attached to the inner end of a temperature setting shaft 126 located in axial alignment with the shaft 108. The shaft 126 projects through a sleeve 128 formed as a portion of the housing 80 and has its outward end attached to a collar 130 by means of a transversely extending rivet 132. The collar 130 has a lever 134 attached thereto by means of which the collar can be readily manually rotated. The outer surface of the collar 130 is cylindrical and is gripped by a clamping band 136, the band being clamped at its ends by means of a screw 138 and nut 140, the screw extending through an offset bracket 142 formed as a portion of the housing 80.

Over a portion of its area the band 136 is slotted longitudinally, as indicated at 144, so that an operator may readily perceive the portion of the cylindrical collar surface lying therebeneath. At one point the edge of the slot is formed to provide a pointer 146. The portion of the cylindrical collar surface immediately beneath the slot in the band carries indicia, Fig. 8, which in the present instance, indicates temperature settings for the heater. To set the heater, the screw 138 is loosened and the handle 134 is moved by the operator until the desired temperature indicating numeral is located opposite the pointer 146. The screw 138 is then tightened to restrain further movement.

After the desired temperature setting has been made, and the heater has been started, the device operates in the following manner: Air will be drawn in by the blower 10 and will be forced through the heat exchanger 18 within which heat from the combustion chamber will be transferred by the fins 16 to the air stream. A portion of this air will be diverted by the scoop 92 and will flow into the central chamber 98 of the thermostatic unit, the air then flowing back to the interior of the heat exchanger through the vent 94. Hot air passing through chamber 90 will heat the bi-metal coil 122 to approximately the air temperature, thus causing relative angular displacement between the coil ends. Since the outer end of this coil is anchored to the cup 124, which in turn is supported by the shaft 126, held against rotation by the clamp 136, the inner end of the coil will rotate from side to side with changes in the air temperature. The torque produced by this coil will rotate the shaft 108 and this rotation will be transmitted through the pin and slot connection made up of the elements 116 and 114 to the butterfly valve 52, thus causing the butterfly valve to rotate from side to side in a similar manner.

Any increase in the temperature of the air flowing through the heat exchanger will therefore be reflected by rotation of the inner end of the coil 122 in one direction and by a similar rotation of the butterfly 52 toward closed position. The result is that the quantity of combustible mixture admitted to the combustion chamber will be decreased, thus reducing the heat available to be transferred through the heat exchanger to the air passing therethrough. Similarly any decrease in the temperature of the air passing through the heat exchanger will be reflected by an opening of the valve 52.

It will be seen that the arrangement provided by the present invention is such that a minimum of friction is involved in the system. For instance, the butterfly valve is journaled in antifriction bearings, while the shaft 108 is similarly journaled at one end, the opposite end of the shaft 108 being piloted in the socket 118 attached to the outer end of the shaft 54. The arrangement, therefore, eliminates any tendency toward binding in the torque transmission system and practically no lost motion is incurred anywhere within the connections. The mechanism, therefore, causes the butterfly valve closely to follow temperature changes within the heat exchanger. In other words, by reducing the friction to a minimum, great sensitivity is obtained.

While I have shown and described a particular embodiment of my invention, it will be apparent to those skilled in the art that numerous modifications and variations may be made without departing from the underlying principles of the invention. I therefore desire, by the following claims, to include within the scope of the invention all such modifications and variations by which substantially the results thereof may be obtained by the use of substantially the same or equivalent means.

I claim:

1. An automatic control system for use in an internal combustion heater system having an inlet for combustible mixture, a heat exchanger and means to circulate air to be heated through the heat exchanger, comprising a rotatable butterfly valve in said inlet, a helical bi-metallic thermostatic element in substantial axial alignment with the axis of rotation of said butterfly valve, said thermostatic element being positioned adjacent the outlet end of said heat exchanger, air diverting means to divert a portion of the air flowing through said heat exchanger to said thermostatic element, conduit means to return the diverted air to said heat exchanger, and torque transmission means connecting said thermostatic element to said butterfly valve.

2. An automatic control system for use in an internal combustion heater system having an inlet for combustible mixture and a heat exchanger and means to circulate air to be heated through the heat exchanger, comprising a rotatable butterfly valve in said inlet, a helical bi-metallic thermostatic element in substantial axial alignment with the axis of rotation of said butterfly valve, said thermostatic element being positioned adjacent the outlet end of said heat exchanger, air diverting means to divert a portion of the air flowing through said heat exchanger to said thermostatic element, conduit means to return the diverted air to said heat exchanger, torque transmission means connecting said thermostatic element to said butterfly valve, and manually movable means to predetermine the angular position of said thermostatic element.

3. An automatic thermostatically operated valve, comprising means forming a passage, a butterfly valve arranged in said passage, rotatable drive means extending from said butterfly valve in alignment with its axis of rotation, a coiled thermostatic element attached at one end to said drive means at a position remote from said valve, means forming an enclosure for said thermostatic element, scoop means arranged to one side of said enclosure and adapted to divert air flowing in a position to one side of said enclosure into a position within said enclosure, means providing an outlet for said diverted air, and manually movable means adapted to be pre-set to determine the angular position of said thermostatic element.

4. An automatic thermostatically operated valve, comprising means forming a passage, a butterfly valve arranged in said passage, rotatable drive means extending from said butterfly valve in alignment with its axis of rotation therewith, a coiled thermostatic element attached at one end to said drive means, means forming an enclosure for said thermostatic element, scoop means arranged to one side of said enclosure and adapted to divert air flowing in a position to one side of said enclosure into a position within said enclosure, means providing an outlet for said diverted air, and manually movable means adapted to be pre-set to determine the angular position of said thermostatic element.

5. An internal combustion heater comprising, means providing an inlet passage for combustible mixture, a combustion chamber connected to said passage, a heat exchanger connected to said combustion chamber, air circulating means, conduit means adapted to convey air from said circulating means through said heat exchanger in heat exchange relation to the products of combustion flowing through said heat exchanger, a throttle valve in said inlet passage, a thermostatic element connected to actuate said throttle valve, said thermostatic element being positioned near the outlet end of said heat exchanger and to one side of said heat exchanger, means forming an enclosure for said thermostatic element, air diverting means adapted to divert a portion of the air flowing through said heat exchanger into said enclosure, and means forming an outlet for said diverted air.

6. An internal combustion heater comprising, means providing an inlet passage for combustible mixture, a combustion chamber connected to said passage, a heat exchanger connected to said combustion chamber, air circulating means, conduit means adapted to convey air from said circulating means through said heat exchanger in heat exchange relation to the products of combustion flowing through said heat exchanger, a butterfly throttle valve in said inlet passage, a helical thermostatic element in axial alignment with said butterfly valve and connected to actuate said valve, said thermostatic element being positioned near the outlet end of said heat exchanger and to one side of said heat exchanger, means forming an enclosure for said thermostatic element, air diverting means adapted to divert a portion of the air flowing through said heat exchanger into said enclosure, and aspirating means located in said heat exchanger air stream and connected to said enclosure to return diverted air to said heat exchanger air stream.

7. An automatic thermostatically operated valve for use in conjunction with, and responsive to the temperature of, a moving fluid stream, comprising a movable valve element, a temperature sensitive valve operating element connected to operate said valve, means forming a casing enclosing said temperature sensitive element, fluid diverting means to divert a small portion of the fluid moving in said stream to said casing, and means forming a passage to return diverted fluid from said casing to said stream, whereby the temperature of said temperature sensitive element is always substantially the temperature of said moving fluid stream without the mechanism imposing appreciable restriction to the flow within said moving fluid stream.

HENRY J. DE N. McCOLLUM.